(12) United States Patent
Berg

(10) Patent No.: US 6,466,726 B1
(45) Date of Patent: Oct. 15, 2002

(54) DEVICE FOR FASTENING OPTICAL FIBRES

(75) Inventor: Arne Berg, Kattem (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 09/601,345

(22) PCT Filed: Feb. 1, 1999

(86) PCT No.: PCT/NO99/00027

§ 371 (c)(1),
(2), (4) Date: Aug. 18, 2000

(87) PCT Pub. No.: WO99/44024

PCT Pub. Date: Sep. 2, 1999

(30) Foreign Application Priority Data

Feb. 26, 1998 (NO) ............................... 19980796

(51) Int. Cl.⁷ ................................. G02B 6/00
(52) U.S. Cl. ........................... 385/137; 385/62
(58) Field of Search ................. 385/137, 37, 62, 385/80, 81

(56) References Cited

U.S. PATENT DOCUMENTS

| 3,946,467 A | | 3/1976 | Lukas et al. ............... 24/537 |
| 4,330,171 A | * | 5/1982 | Malsot et al. ............. 358/80 |
| 4,696,537 A | * | 9/1987 | Bauer et al. ............... 385/81 |
| 4,795,231 A | * | 1/1989 | Tanabe ...................... 385/60 |
| 4,813,760 A | * | 3/1989 | Tanaka et al. ............. 385/62 |
| 5,367,589 A | | 11/1994 | MacDonald et al. ........ 385/37 |
| 5,446,817 A | * | 8/1995 | Kardos et al. ............. 385/72 |
| 5,598,500 A | * | 1/1997 | Crespel et al. ........... 385/139 |
| 5,602,951 A | * | 2/1997 | Shiota et al. ............. 385/81 |
| 5,617,495 A | * | 4/1997 | Funabashi et al. .......... 385/92 |
| 5,668,906 A | * | 9/1997 | Yamamura et al. .......... 385/83 |
| 5,742,719 A | * | 4/1998 | Birnbaum ................. 385/70 |
| 5,862,289 A | * | 1/1999 | Walter et al. ............ 385/134 |
| 6,091,877 A | * | 7/2000 | Eslambolchi et al. ...... 385/136 |
| 6,238,103 B1 | * | 5/2001 | Ezawa ..................... 385/81 |

FOREIGN PATENT DOCUMENTS

JP 62293210 * 12/1987 ............ G02B/6/32

* cited by examiner

Primary Examiner—Brian Sircus
Assistant Examiner—Hae Moon Hyeon
(74) Attorney, Agent, or Firm—Dennison, Schultz & Dougherty

(57) ABSTRACT

A combination of an optical fiber, a device for fastening the optical fiber to at least one Bragg grating including a generally cylindrical sleeve through which the fiber passes, and a bond between the fiber and the sleeve at one end thereof. The end of the sleeve to which the fiber is bonded permits expansion of the bond radially with respect to the optical fiber.

4 Claims, 2 Drawing Sheets

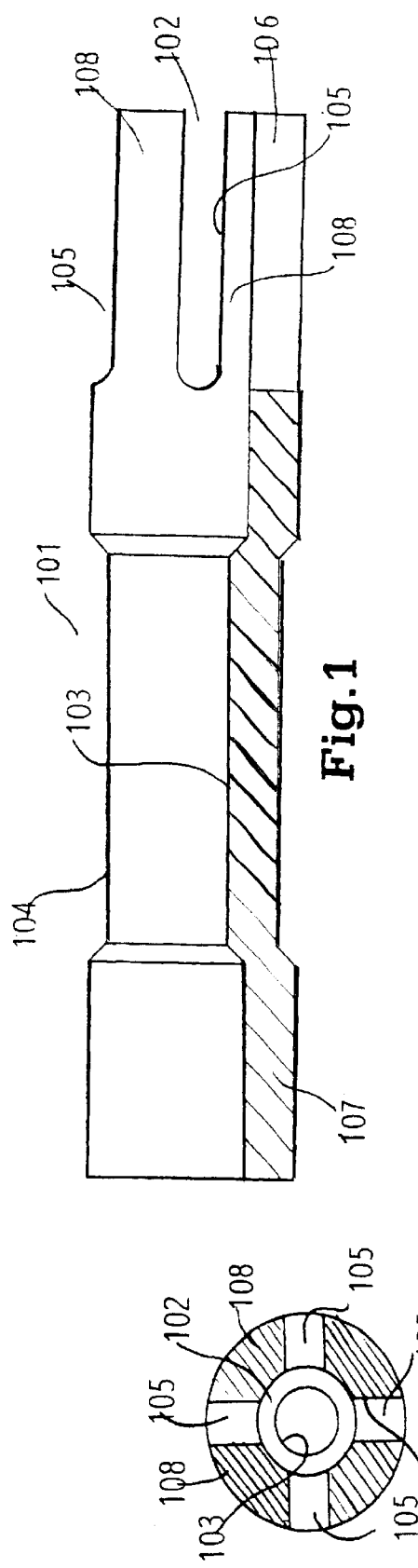
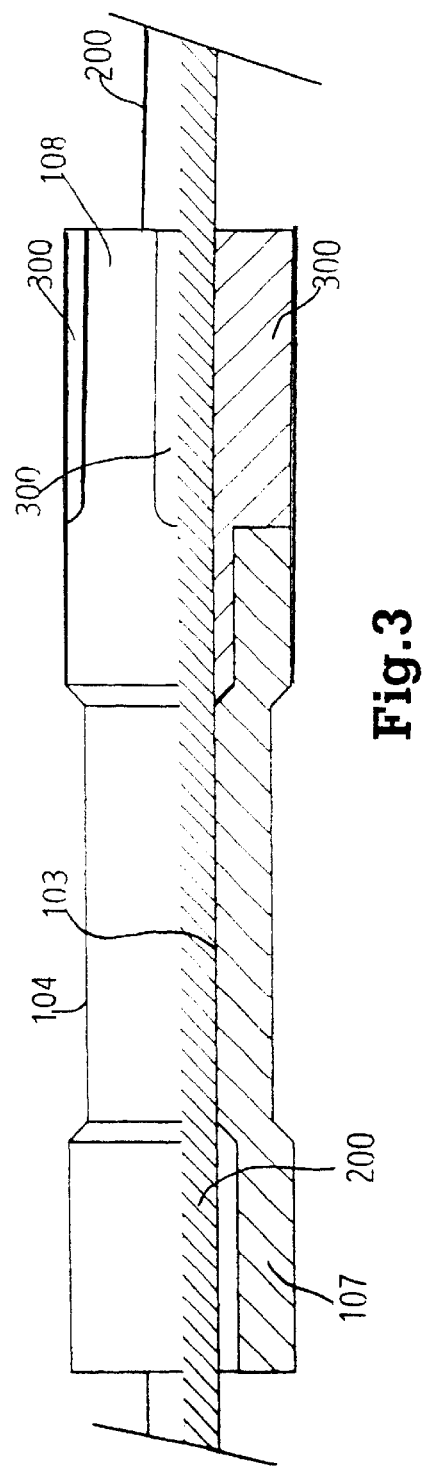

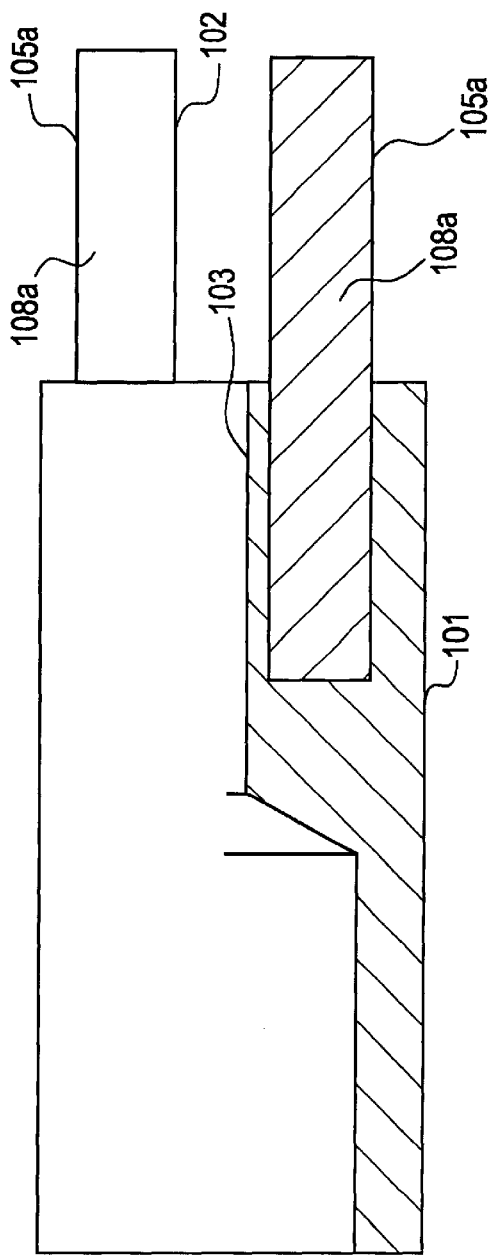
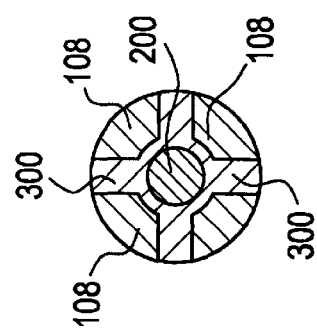
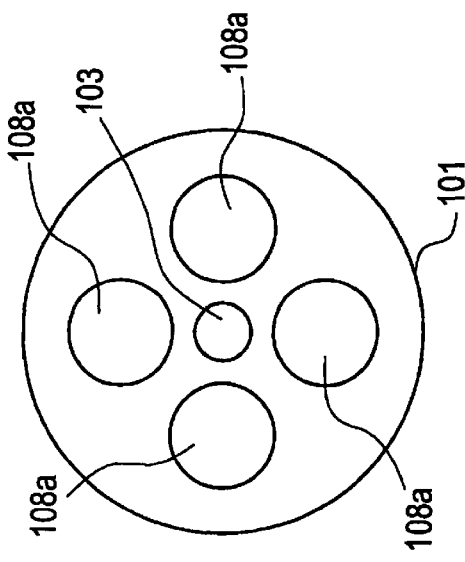

DEVICE FOR FASTENING OPTICAL FIBRES

The present invention relates to a device for fastening optical fibres.

BACKGROUND OF THE INVENTION

The present invention relates especially to the application of fibre optical Bragg gratings, for use in sensors, where the fibre must often be glued for stability. A Bragg grating is a single modus fibre with a permanent periodic variation in the refraction index over a fibre length of e.g. 0,1 to 10 cm. The variation in the refraction index is established by illuminating the fibre with a UV-laser. A Bragg grating reflects light at a wavelength given by the refraction index and the space period of the refraction index variation (grating period), while light outside this wavelength is passing through the grating more or less unimpeded. The light reflected by the Bragg grating, will exhibit a wavelength which varies as a function of a measuring-size that changes the reflection index of the fibre material in the Bragg grating, and/or the length of the fibre in the grating zone (grating period). Tensions in the fibre or temperature will therefore give a change in the wavelength of the light that is reflected by the Bragg grating.

A number of devices exits for measuring stresses in mechanical constructions. In particular for application areas where little space is available, or there is high temperature, high tension etc., the known devices for measuring tension have disadvantages. For example, to measure tension underwater, tension sensors based on electrical elements are used, which in those kinds of environments have low reliability. In other cases, it may be that very little space is available for installing extra components, such as tension sensors based on induction or capacity (typical diameter is 10–20 mm). Another example is the monitoring of dams with sensors based on electrical strain gauges. In these cases it has happened that lightning has passivated the sensor element, and/or the electronics, and the monitoring of tension therefore does not happen.

Thus, a need has been identified for sensors with mainly passive components, which may be used in stringent environments and in narrow locations. Sensors based on optical fibres and Bragg technology may be developed for such applications, but this demands a fastening technique with the requirements for quality and size.

Examples of sensor designs with optical fibres and Bragg-technology, are, for example, given in the Norwegian patent applications 19973038, 19975657 and 19975656, in the name of the applicant, which were not published at the filing date of the present application. Examples of areas of application of these senors, are temperature monitoring of supply cables and pipelines, measuring of pressure in boreholes, and tensions in huge constructions or cables.

In practice, the fibre is glued to a sensor construction, in order to provide a stable fastening of devices which transfer tension to the grating as a function of, for example, pressure or tension. However, in certain applications, mechanical stress may be transferred to the optical fibre because of the different thermal expansion characteristics of the fastening device, and the fastening material, such as glue, which again might lead to variance in the results.

SUMMARY OF THE INVENTION

The object of the present invention is to provide a device for the fastening of optical fibres and/or Bragg gratings, which reduces the dangers of variance in the results caused by variations in the temperature, and offers simultaneously a method for producing very small sensors.

To achieve this and other objects, the invention relates to a device for the fastening of optical fibres in mechanical constructions, a device which will hereinafter also be termed a "sleeve".

THE INVENTION

The object is fulfilled with a device according to the characterizing part of patent claim 1. Further advantageous features are given in the dependent claims.

The invention relates to a device for the fastening of optical fibres in mechanical constructions, the device will hereinafter also termed a "sleeve".

The invention relates to a device for fastening an optical fibre with one or more Bragg gratings or equivalent, for use in a sensor means such as pressure, tension or bending sensors, wherein the optical fibre is tightly connected to a holding means by a fastening material such as adhesives based on polymers or metallic adhesives such as tin solder.

According to the invention, the holding device is provided with recesses or similar, in order to allow expansion of the fastening material in a direction generally radial to the length of the optical fibre.

The recesses may, for example, be established with, at the least, two longitudinal slits or similar, in the holding means (hereinafter also termed sleeve), in order to establish two cylinder-shell segments in the end of the sleeve. Upon installation of the optical fibre, a fastening agent, such as glue, is added in the cavity in the end of the sleeve in order to fasten the optical fibre to the holding means. With this embodiment of the holding means, the glue (and the segments in the end of the sleeve) will be allowed to expand and contract with variations in the temperature, with the assistance of these openings.

This fundamental embodiment of a sleeve, makes it possible to produce the device in a very small size, with automatic centring of the fibre and a natural cavity for the fastening agent. Furthermore, the device makes radial expansion of the fastening agent possible, but also offers a great longitudinal stability.

The holding means according to the invention, normally constitutes one of two fastening points for a fibre segment with an intervening Bragg grating.

BRIEF DESCRIPTION OF THE DRAWINGS

The invention will be described in detail with reference to the accompanying figures, in which:

FIG. 1 shows a schematic example of a device according to the invention, for fastening an optical fibre in a holding means, shaped as a sleeve with small diameter, FIG. 2 shows the sleeve of FIG. 1 from one end, FIG. 3 shows the sleeve with a glued optical fibre, FIG. 4 shows the sleeve with the glued optical fibre of FIG. 3, from one end, FIG. 5 shows an example of an alternative sleeve according to the invention, and FIG. 6 shows the sleeve of FIG. 5 from one end.

DESCRIPTION OF THE PREFERRED EMBODIMENTS

FIG. 1 shows a first embodiment of the device according to the invention, hereinafter termed a "sleeve". FIG. 1 is shown partly in cross section (along the lower part of the sleeve) axially through the same, whereby the solid part of the sleeve 101 is illustrated by 107. The sleeve 101 comprises a generally cylindrical housing with an inner cavity 102 shaped as a cylinder. The cavity 102 has a narrower section 103 in the direction away from the opening, with a diameter a little larger than the outer diameter of the optical fibre, so that the fibre may move freely longitudinal. The narrowing of the diameter may, for example, be made by mechanically shrinking the sleeve on the outside 104. At the end of the tube, the openings for radial expansion are established as longitudinal slits or recesses 105 in the sleeve wall, which stretches longitudinally along the sleeve, and at a certain distance from the end of the sleeve, so that the tube wall may move radially outwards. These recesses result in fingers or similar shown at 108. An interior surface of one of the fingers 108 is shown by 106 (the axial cross section).

FIG. 2 shows the sleeve from the split end, shown with four equal parts.

FIG. 3 shows an optical fibre 200 fastened in the sleeve 101 with a fastening agent 300. The fastening agent may be an adhesive based on plastics (for example, epoxy), a glass glue, or a metallic material (for example, tin solder). The extension of the glue inside the sleeve will be limited by the narrow section 103, which therefore gives a controlled and reproducible gluing.

The longitudinal splits 105 which allow a radial movement, are important because most fastening agents 300 have a thermal expansion coefficient different to the sleeve 101. The differences may give thermally generated tensions, and, at worst, breakage as a result of thermic cycling (alternate high and low temperature). As an example, the expansion coefficient for steel is normally $1.2*10^{-5}$, while for epoxy it might, at high temperatures, be as high as $15*10^{-5}$. If the sleeve is not split, the expansion of the glue might lead to a movement in the glue towards the opening, which would move the fibre outwards, and may cause sensors based on Bragg gratings, to work. The split offers a possibility for radial expansion of the glue, which reduces the danger for longitudinal movements. The split will have a positive effect on the reliability of fastening with materials of both a higher (for example, epoxy) and lower (for example, glass glue) expansion coefficient than the sleeve.

The narrow section 103 is advantageous when the sleeve is to be a part of a pressure seal. The cross section of the glue joint exposed towards the pressure will be small, so that the resulting force (pressure * area) will be small. Such pressure seals can be used as independent components, or as a part of a sensor based on Bragg gratings.

The split 105 may also be performed by a thin side-milling cutter or diamond blade. They may also be cut with laser. Alternatively, corroding or sparking are other current possibilities. The production-technique ought to be chosen with consideration of the dimensions of the sleeve, and the number which should be produced.

FIGS. 5 and 6 show an alterative embodiment of the sleeve, giving the same technical effect. The end of the sleeve is, in this embodiment, provided with four pins or the like 108a, which establish support for the fastening agent (not shown) for fastening the fibre to the holding means, and simultaneously openings 105a, in order to make radial expansion/contraction of the fastening agent, caused by variations in the temperature, possible. The four pins 108a may move radially, but provides a good longitudinal anchoring. The pins 108a may be fastened to the basic sleeve 101 with alternative techniques, such as soldering, gluing etc. The narrow section of the sleeve may also be created by, for example, establishing bores with varying diameter in a bolt.

What is claimed is:

1. In combination, an optical fiber;

a device for fastening the optical fiber with at least one Bragg grating, comprising a generally cylindrical sleeve defining a bore therethrough, through which the fiber passes, said bore including a portion of reduced diameter recessed from an end thereof; and bonding means bonding the fiber to the sleeve at the end from which the portion is recessed;

wherein the end of the sleeve to which the fiber is bonded comprises means permitting expansion of the bonding means radially with respect to the optical fiber.

2. A combination according to claim 1, wherein the end of the sleeve to which the optical fiber is bonded defines longitudinal slits between sleeve portions, which slits permit radial expansion of the sleeve.

3. A combination according to claim 1, wherein the end of the sleeve to which the optical fiber is bonded comprises at least two pins defining openings therebetween, which openings permit radial expansion.

4. A combination according to claim 1, wherein the bonding means comprises adhesive, polymer or solder.

* * * * *